Sept. 19, 1961 P. R. JUCKNIESS 3,000,705
PREPARATION OF BORON TRICHLORIDE
Filed Jan. 22, 1959
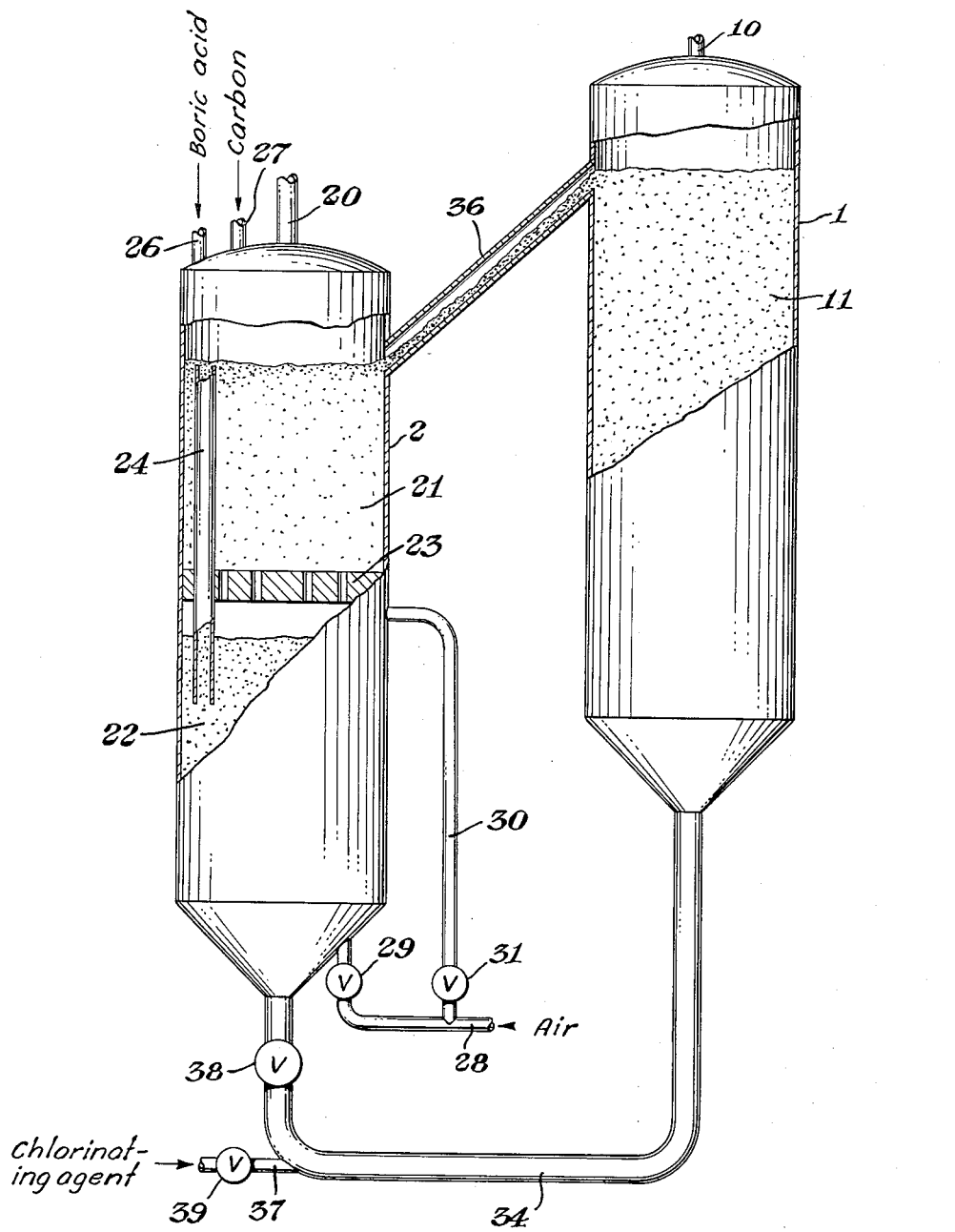
INVENTOR.
Paul R. Juckniess
BY
ATTORNEY Patented Sept. 19, 1961

3,000,705
PREPARATION OF BORON TRICHLORIDE
Paul R. Juckniess, Midland, Mich., assignor to The Dow Chemical Company, Midland, Mich., a corporation of Delaware
Filed Jan. 22, 1959, Ser. No. 788,372
5 Claims. (Cl. 23—205)

This invention relates to a process for the preparation of boron trichloride, and more particularly, to an improved process for the preparation of boron trichloride from boric acid, carbon, and a chlorinating agent.

Methods of reducing boron compounds with carbon and chlorine to obtain boron trichloride are known. In most of the prior art processes, a boron compound, such as boric oxide or borax, is often used. Nevertheless, boric acid, which is readily available, is not a desirable reactant. It decomposes to form boric oxide and water upon heating. The presence of water in the reaction mixture results in an excessive consumption of chlorine and reduces the yield of $BCl_3$. Also in most of the prior art processes a carbon low in volatile constituents, such as hydrogen and the like, is desired. Generally, a reaction between the volatile matter and the chlorine is obtained which increases the amount of the chlorinating agent needed.

It is, therefore, a principal object of this invention to provide an improved process for the production of boron trichloride. It is a further object to provide an improved process whereby boron trichloride is produced by using boric acid as one of the reactants. A further object is to provide a process wherein carbon containing volatile matter, such as hydrogen, may be used without resulting in a high consumption of the chlorinating agent.

The above and other objects are attained according to the invention by employing two fluidized beds. In one of the fluidized beds the boric acid and uncalcined carbon are converted to an anhydrous mixture of boric oxide and carbon in proportions and at a temperature desirable for the reaction of the mixture with a chlorinating agent. In the second fluid bed, the anhydrous mixture of boric acid and carbon from the first reactor is reacted with a chlorinating agent.

To one of the fluidized beds (referred to herein as the first fluidized bed) the carbon and boric acid is continuously introduced. The carbon and boric acid are added to the fluidized bed in proportions such that after partial oxidation of the carbon in the bed, a mixture of carbon and boric oxide is obtained which contains from about 2 to 7 weight percent of boric oxide. Air is passed up through the bed thereby fluidizing the bed and oxidizing a portion of the carbon in the bed to heat it to a temperature preferably in the range of 800° to 1100° C. At this temperature the boric acid is converted to boric oxide and water vapor and the unburned carbon calcined to drive off the volatile matter that it may contain. The water vapor, the volatile matter of the carbon, and the combustion products are discharged from the bed.

A portion of the heated mixture of carbon and boric oxide from the first fluidized bed is continuously passed into a second fluidized bed which is maintained preferably at a temperature of about 800° to 1000° C. and fluidized by a chlorinating agent charged into the bottom of the bed. The chlorinating agent reacts with the boric oxide and carbon to form a gaseous effluent containing boron trichloride. The gaseous effluent is discharged from the second bed and the boron trichloride recovered from it. A portion of the second fluidized bed, which contains unreacted boric oxide and carbon, is passed continuously to the first fluidized bed where it is intermixed with the first bed, and the incoming carbon and boric acid heated by the oxidation of part of the carbon, and returned to the second bed in a resulting mixture containing the desired ratio of carbon to boric oxide to react with more chlorinating agent. Thus, by employing two fluidized beds and recycling continuously a portion of each bed from one bed to the other, boric acid may be used as one of the reactants in the production of boron trichloride without using an excessive amount of the chlorinating agent.

The invention in itself as to the objects, advantages, and mode of operation, may be better understood by referring to the following description taken in connection with the drawing which diagrammatically illustrates an apparatus in which the invention may be practiced.

The apparatus shown in the drawing comprises two fluidized bed type reactors 1 and 2, respectively, which are interconnected by appropriate piping.

Reactor 1 is a vertically disposed cylindrical vessel having a gas outlet 20 at the top and containing a fluidized bed 11 comprising particulate carbon and boric oxide. Reactor 2, as shown is also a vertically disposed cylindrical vessel having an outlet 20 at the top and containing fluidized beds 21 and 22, bed 21 being maintained in the upper portion of the reactor and bed 22 at the lower part of the reactor. The beds are separated by a gas distributor section 23 which provides a support for the upper fluid bed and also acts as a distributor for the air and gaseous products passing up from bed 22. Standpipe 24 provides means for the particles in the upper fluid bed 21 to pass to the lower bed 22 by means of gravity. Reactor 2 also has two inlets 26 and 27, respectively, located at the top through which the boric acid and carbon in particulate form may be introduced into the reactor. An inlet at the bottom of the column is connected to an air line 28 in which a valve 29 is installed. A second air line 30 branching off from line 28 is connected to an inlet into the vessel near the midsection of reactor 1 so that air can be discharged and distributed under distributor 23. Line 30 is equipped with valve 31 by which means the amount of air flowing may be controlled.

Reactors 1 and 2 are interconnected by means of lines 34 and 36 through which portions of the fluidized beds are transferred from one reactor to another. Line 34 connects an outlet at the bottom of reactor 2 with an inlet at the bottom of reactor 1. The chlorinating agent is injected into line 34 by means of line 37. Line 34 is used to convey a portion of the lower fluidized bed 22 of reactor 2 which contains the carbon and boric oxide into reactor 1. A valve 38 located in line 34 regulates the amount of the bed being transferred. The chlorinating agent which reacts with the boron oxide and carbon in reactor 1 is used as a medium to transport the boric oxide and carbon mixture from fluid bed 22 of reactor 2 into reactor 1. The chlorinating agent also acts as a fluidizing medium in reactor 1. Valve 39 in line 37 regulates the amount of the chlorinating agent being introduced. Line 36 is used as a means of passing a portion of the fluidized bed 11 from reactor 1 to bed 21 in reactor 2. Reactor 1 as shown is disposed at an elevation higher than reactor 2 so that the portion of the fluidized bed which overflows into line 36 from reactor 1 passes to reactor 2 by gravity.

In the operation of the apparatus, a fluidized bed 11 comprising essentially boric oxide and carbon is maintained within reactor 1 and two fluidized beds 21 and 22 are maintained within reactor 2. As the operation proceeds boric acid is introduced into the upper fluid bed 21 in reactor 2 through line 26, while carbon is particulate form is introduced into the same bed through line 27. The boric acid and carbon so introduced intermixed with the unreacted carbon and boric oxide coming from the bed of reactor 1 through line 36. Air is introduced through lines 28 and 30 into reactor 2. In bed 21 the freshly charged boric acid and carbon are heated to a temperature which will cause the decomposition of the boric acid and the volatilization of any volatile matter that the carbon may contain. The amount of air introduced to this section is regulated by means of valve 31 in line 30 so that the desired temperature is obtained from the resulting oxidation reaction of carbon and more or less of its volatile constituents to decompose substantially all of the boric acid introduced. The oxidation products, the unburned volatile constituents of the carbon, and the water vapor formed upon the decomposition of the boric acid is discharged from the bed through line 20. The bed 21 thus comprises mainly calcined carbon and boric oxide resulting from the partial oxidation of the mixture of carbon, boric acid, and the portion of bed 11 recycled to bed 21.

A portion of the bed falls through standpipe 24 into bed 22 located in the lower portion of reactor 2. A portion of the carbon in lower bed 22 is oxidized by the passage of air through the bed by opening valve 29. In the bed the particulate carbon and boric oxide are further heated as a result of the ensuing oxidation. Moisture that may be carried by the carbon and boric oxide introduced from bed 21 is driven off. The oxidation products and other volatile constituents formed by the partial oxidation of the carbon in the bed 22 pass through distributor plate 23 and through the upper bed 21 before being discharged through the discharge line 20 located at the top of reactor 2.

While it is not essential to have two beds in reactor 2 as shown, a product of calcined carbon and boric oxide which is substantially free of moisture is more conveniently obtained with two beds than if one bed were used. Also it is easier to control the temperature of the carbon and boric oxide mixture which is introduced into reactor 1. By using the two beds, the major portion of the water and the volatile constituents of the carbon are driven off in the upper bed at a lower temperature and the lower bed 22 is used mainly as a means of controlling the temperature of the boric acid and carbon mixture before introducing it into reactor 1.

Upon heating the boric oxide and carbon mixture in fluidized bed 22 to the desired temperature, the mixture is discharged into the bottom of reactor 1 through line 34. The amount of the mixture introduced into reactor 1 is regulated by means of valve 38. The chlorinating agent is injected into line 34 and used as a means of carrying the mixture from the lower portion of reactor 2 into reactor 1. Its flow is regulated by means of valve 39. The reaction of the chlorinating agent with boric oxide and carbon in reactor 1 is slightly endothermic and thus the carbon and the boric oxide introduced will be cooled as the reaction proceeds. The retention time within the reactor is controlled with respect to the amount of chlorinating agent introduced so that substantially all of the chlorinating agent introduced is reacted and also so that the major portion of the boric oxide is also reacted. A portion of the fluidized bed in reactor 1 which has been reacted with the chlorinating agent and its content of boric oxide reduced overflows through line 36 into the upper bed of reactor 2. There it is intermixed with newly introduced boric acid and carbon as described and the cycle repeated. Thus in the process a portion of the carbon and boric oxide mixture of the fluidized beds is continually being recycled from one reactor to the other. In reactor 1 the reaction between the carbon and boric acid with the chlorinating agent is effected, while in reactor 2 the boric acid and carbon are heated and converted into a desired mixture for the reaction in reactor 1.

Although a reaction temperature as low as about 400° C. may be used in reactor 1, for the reaction of the boric oxide and carbon with the chlorinating agent, a temperature in the range of 600° to 1200° C. is generally employed, preferably in the range of 800° to 1000° C. In the preferred temperature range the rate of reaction is sufficiently rapid so that a temperature above 1000° C. is seldom used.

In reactor 2 or in the decomposition of the boric acid, a sufficiently higher temperature is used to decompose the boric acid to boric oxide. Boric acid will decompose at temperatures as low as 200° C., but the rate of decomposition is slow. At a temperature of at least 700° C. substantially complete decomposition of the acid to boric oxide and water vapor is obtained in a reasonably short time. Since the reaction of boric oxide with carbon and chlorine is slightly endothermic, it is generally desirable to heat the mixture of carbon and boric oxide by the oxidation of a portion of the carbon in reactor 2 to a temperature about 75° to 200° C. higher than the reaction temperature in reactor 1. In this manner, sufficient heat is added to reactor 1 to compensate for the heat utilized in the reaction effected in reactor 1. Thus, reactor 2 is generally operated so that the mixture of carbon and boric oxide is preferably heated to a temperature of 900° to 1200° C. before being introduced into reactor 1. When two beds are used in reactor 2 as shown in the attached drawing, the upper bed where the boric acid and the carbon are initially intermixed is generally maintained at a temperature of 800° to 900° C. and the lower bed at a temperature of 75° to 200° C. above the reaction temperature in reactor 1.

It is essential to control the ratio of the boric acid to the carbon being charged into the reactor 2. The ratio of the amount of boric acid to that of the carbon is such that after the partial oxidation of the carbon and the conversion of the boric acid to boric oxide, a mixture of calcined carbon and boric oxide is obtained which contains not more than about 7 weight percent of boric oxide. At the reaction temperature the boric oxide is in a molten state and is a viscous liquid. When the proportion of the boric oxide in the mixture is greater than 7 weight percent, agglomeration of the molten boric oxide with the carbon may occur. The molten compound and carbon particles will form large masses which will settle to the bottom or adhere to the side of the vessel and plug the bed. By maintaining the proportion of the boric compound in the bed to not more than 7 weight percent of boric oxide, the boric oxide is dispersed throughout the bed with the carbon particles surrounding the molten oxide to keep them from sticking together. It is generally preferred to use a mixture containing from 3 to 5 weight percent of boric oxide. Higher ratios of carbon to the oxide are operative but undesirable, since larger reactors are required in order to obtain a particular capacity of boron trichloride. In reactor 1, the boric oxide is reacted with the carbon and the chlorinating agent to give a fluidized bed having a content of from 3.0 to about 0.5 weight percent of the boric oxide. By the time the boric oxide content has been reduced to the above level, the heat removed by the heat of reaction is approximately equal to the sensible heat added to reactor by the introduction of the carbon and boric oxide from reactor 2 at the higher temperature of the second reactor.

The amount of chlorinating agent charged into reactor 1 is generally less than the stoichiometric amount required to react with all of the boric oxide in the reactor. A stoichiometric amount or even an excess of the chlorinating agent may be used, but it is undesirable due to the possibility of phosgene formation. Chlorine and other chlorinating agents such as phosgene, thionyl chloride, phosphorous chloride, phosphorous pentachloride, carbon tetrachloride, and sulfurous oxychloride may be used. Generally the amount of the chlorinating agent required is such that it is sufficient to fluidize the particulated carbon and boric oxide in the bed. Other gases such as nitrogen may be added to help fluidize the bed, if necessary. Also in reactor 2, an inert gas may be intermixed with air, if necessary, to help fluidize the bed.

Since the carbon is calcined in reactor 2 before being reacted with the boric oxide and the chlorinating agent, carbon containing a high percentage of volatile matter may be used. Carbon from many sources, such as petroleum coke, charcoal, activated carbon, char, or coke obtained from coke ovens may be employed. The particles of the carbon must be reduced to sufficient size so that they may be fluidized. Particles of carbon passing through a 20 mesh U.S. standard screen and being retained on a 200 mesh standard screen are satisfactory. Smaller particles such as those passing through a 100 mesh U.S. standard screen and being retained on a 200 mesh may be preferred, since more surface is obtained than with larger particles. The boric acid added must likewise be in a particulate form but a wide range of particle sizes may be employed. Generally, boric acid as available in powder form commercially may be used without further crushing or grinding of the material. For ease of handling and charging the boric acid, it is desirable to maintain the particle size below about ⅛ of an inch.

In the reaction of boric oxide with the carbon and the chlorinating agent, the reaction products obtained are boron trichloride, carbon monoxide, and carbon dioxide. These constituents are gaseous and leave the reactor 1 through pipe 10 where the boron trichloride is separated in known manner from the carbon monoxide, carbon dioxide and any other constituents which may be present in the gas effluent. Solvent extraction of the boron trichloride or condensation of the boron trichloride by just cooling the gaseous mixture are the most convenient methods of recovering the boron trichloride.

In a typical operation of the process using the apparatus as shown in the attached drawing, the boric acid and the carbon in particulate form are introduced into reactor 2 in a ratio of around 1.75 pounds of carbon per pound of boric acid. A portion of the carbon, 1.42 pounds per pound of the boric acid is burned in the reactor in order to heat the mixture to the desired temperature of 1000° C. and to decompose the boric acid. The remainder of the carbon is intermixed with the boric oxide to give a mixture containing approximately 3 weight percent of boric oxide. Around 40 pounds of the mixture of carbon and boric oxide is circulated from reactor 2 to reactor 1 to be reacted with the chlorinating agent per pound of boron trichloride obtained. The chlorinating agent is introduced at a rate to give 0.92 pound of chlorine per pound of boron trichloride obtained. The boron oxide content of the mixture of carbon and boric oxide in reactor 1 is reduced to about 0.5 weight percent of boric oxide by the reaction with the chlorine. Approximately 12 pounds of the mixture per pound of boron trichloride obtained is recycled from reactor 1 to reactor 2. The boron trichloride, carbon dioxide, and carbon monoxide being discharged from reactor 1 is passed through a condenser where the boron trichloride is condensed out.

What is claimed is:

1. A process for the preparation of boron trichloride, which comprises continuously charging carbon and boric acid in particulate form and a recycle mixture of carbon and boric oxide recycled from the process into a fluidized bed of the mixture resulting from a partial oxidation of the charged carbon and boric acid and the recycle mixture, introducing air into the bottom of the fluidized bed to fluidize the bed and to oxidize a portion of the carbon to heat the bed to decompose the boric acid to boric oxide and water vapor and to vaporize any volatile constituents the carbon may contain, said carbon and boric acid being introduced into the fluidized bed in proportions such that after partial oxidation of the carbon a mixture of carbon and boric oxide is obtained containing from 2 to 7 weight percent of boric oxide, passing a portion of the resulting heated carbon and boric oxide mixture from the fluidized bed to a second fluidized bed comprising essentially carbon and boric oxide at a temperature of at least 400° C., charging a chlorinating agent into the second fluidized bed to fluidize the bed and to to react the chlorinating agent with the boric oxide and carbon to form a gaseous effluent containing boron trichloride, recovering the boron trichloride from the gaseous effluent, and recycling a portion of the second fluidized bed to the first fluidized bed to be intermixed with the carbon and boric acid introduced in the first step recited above.

2. A process for the preparation of boron trichloride, which comprises continuously charging carbon and boric acid in particulate forms and a recycle mixture of carbon and boric oxide recycled from the process into a first fluidized bed of the mixture resulting from the partial oxidation of the charged carbon and boric acid and the recycle mixture, introducing air into the bottom of the fluidized bed to fluidize the bed and to oxidize a portion of the carbon to heat the bed to a temperature of at least 700° C. to decompose the boric acid to boric oxide and water vapor and to vaporize any volatile constituents the carbon may contain, said carbon and boric acid being introduced into the fluidized bed in proportions such that after partial oxidation of the carbon a mixture of carbon and boric acid is obtained containing from 2 to 7 weight percent of boric oxide, discharging from the bed the water vapor, the volatile constituents from the carbon, and the oxidation product from the oxidation of the carbon, passing a portion of the heated carbon and boric oxide from the fluidized bed to a second fluidized bed comprising essentially carbon and boric oxide at a temperature in the range of 600° to 1200° C., charging a chlorinating agent into the second fluidized bed to fluidize the bed and to react the chlorinating agent with the boric oxide and carbon to form a gaseous effluent containing boron trichloride, recovering the boron trichloride from the gaseous effluent, and recycling a portion of the second fluidized bed to the first fluidized bed to be intermixed with the carbon and boric acid being introduced in the first step cited above.

3. A process according to claim 2 wherein the air introduced into the fluidized bed oxidizes a portion of the carbon in the bed to heat the bed to a temperature in the range of 900° to 1200° C. and the temperature in the second fluidized bed is in the range of 800° to 1000° C.

4. A process according to claim 3 wherein the chlorinating agent is chlorine and the ratio of carbon and boric acid charged to the first fluidized bed is such that the mixture of carbon and boric acid in the first fluidized bed contains from 3 to 5 weight percent of boric oxide.

5. A process for the preparation of boron trichloride which comprises continuously charging carbon and boric acid in particulate forms and a recycle mixture of carbon and boric oxide recycled from a third fluidized bed in the process into a first fluidized bed of the mixture resulting from the partial oxidation of the charged carbon and boric acid and the recycle mixture, introducing air into the bottom of the fluidized bed to fluidize the bed and to oxidize a portion of the carbon to heat the bed to a temperature in the range of 800° to 900° C. to decompose the major portion of boric acid to boric oxide and water vapor and to vaporize any volatile constituents the carbon may contain, passing a portion of the first fluidized bed into a second fluidized bed of a mixture resulting from the further oxidation of the constituents of the first fluidized bed, introducing air into the bottom of the second bed to further heat the mixture to a temperature of 900° to 1200° C. to substantially decompose all of the boric acid to boric oxide and water vapor and vaporize any volatile constituents the carbon may contain, said carbon and boric acid being introduced into the first fluidized bed in proportions such that after partial oxidation of the carbon in the first and second fluidized bed a mixture of carbon and boric acid is obtained containing from 2 to 7 weight percent of boric oxide, discharging from the first and second bed the water vapor, the volatile constituents from the carbon, and the oxidation product from the oxidation of the carbon, passing a portion of the heated carbon and boric oxide from the second fluidized bed to a third fluidized bed comprising essentially carbon and boric oxide at a temperature in the range of 800° C. to 1000° C., charging chlorine into the third fluidized bed to fluidize the bed and to react the chlorine with the boric oxide and carbon to form a gaseous effluent containing boron trichloride, recovering the boron trichloride from the gaseous effluent, and recycling a portion of the third fluidized bed to the first fluidized bed to be intermixed with the carbon and boric acid being introduced in the first step.

References Cited in the file of this patent
UNITED STATES PATENTS 2,369,212     Cooper _____ Feb. 13, 1945

OTHER REFERENCES

Chemical Engineering, "Novel Chlorination Furnace Shows Promise," September 1957, pages 170–172.

In re Edwards, 109 U.S.P.Q. 380, 1956.